(12) United States Patent
Chow et al.

(10) Patent No.: US 6,938,251 B1
(45) Date of Patent: Aug. 30, 2005

(54) DEFERRED-SYNCHRONOUS MESSAGING SOFTWARE IN A NON-THREADED ENVIRONMENT

(75) Inventors: Ivan Chow, Plano, TX (US); Wing Lee, Irving, TX (US)

(73) Assignee: Sprint Communications Company L.P., Overland Park, KS (US)

(*) Notice: Subject to any disclaimer, the term of this patent is extended or adjusted under 35 U.S.C. 154(b) by 567 days.

(21) Appl. No.: 09/675,267

(22) Filed: Sep. 29, 2000

(51) Int. Cl.[7] .................................................. G06F 9/46
(52) U.S. Cl. ...................................... 718/100; 719/318
(58) Field of Search ........................ 718/100, 102–104, 718/107, 108; 709/200–203, 310, 313–318

(56) References Cited

U.S. PATENT DOCUMENTS

| | | | |
|---|---|---|---|
| 5,566,337 A * | 10/1996 | Szymanski et al. .......... | 710/260 |
| 5,577,043 A * | 11/1996 | Guo et al. ................... | 370/449 |
| 5,694,543 A * | 12/1997 | Inoue ............................. | 714/4 |
| 5,812,768 A * | 9/1998 | Page et al. ................... | 709/228 |
| 5,872,971 A * | 2/1999 | Knapman et al. ........... | 709/101 |
| 6,012,081 A | 1/2000 | Dorn et al. .................. | 709/102 |
| 6,098,090 A * | 8/2000 | Burns ........................... | 709/107 |
| 6,098,104 A * | 8/2000 | Desnoyers et al. .......... | 709/237 |
| 6,178,440 B1 * | 1/2001 | Foster et al. ................. | 709/201 |
| 6,338,078 B1 * | 1/2002 | Chang et al. ................ | 709/102 |
| 6,356,955 B1 * | 3/2002 | Hollberg et al. ............. | 709/315 |
| 6,513,049 B1 * | 1/2003 | Moriyama ................... | 707/201 |
| 6,570,855 B1 * | 5/2003 | Kung et al. .................. | 370/237 |

* cited by examiner

Primary Examiner—Meng-Al Y. An
Assistant Examiner—Syed J Ali

(57) ABSTRACT

The present invention is a method embodied in a deferred-synchronous messaging software for providing deferred-synchronous messaging capability for applications in a non-threading model. In essence, it enables asynchronous behavior to be executed in parallel within a single-threaded environment, without need of either an operating system or programming environment supporting threads in order to perform multiple synchronous calls in different processes. As a result, applications are able to perform simultaneous multiple synchronous calls without spawning multiple processes. The present invention provides a model to allow applications to enhance their business processes without using inter-process communications. Thus, it allows simultaneous multiple business synchronous processing without complex inter-process communication logic.

20 Claims, 1 Drawing Sheet

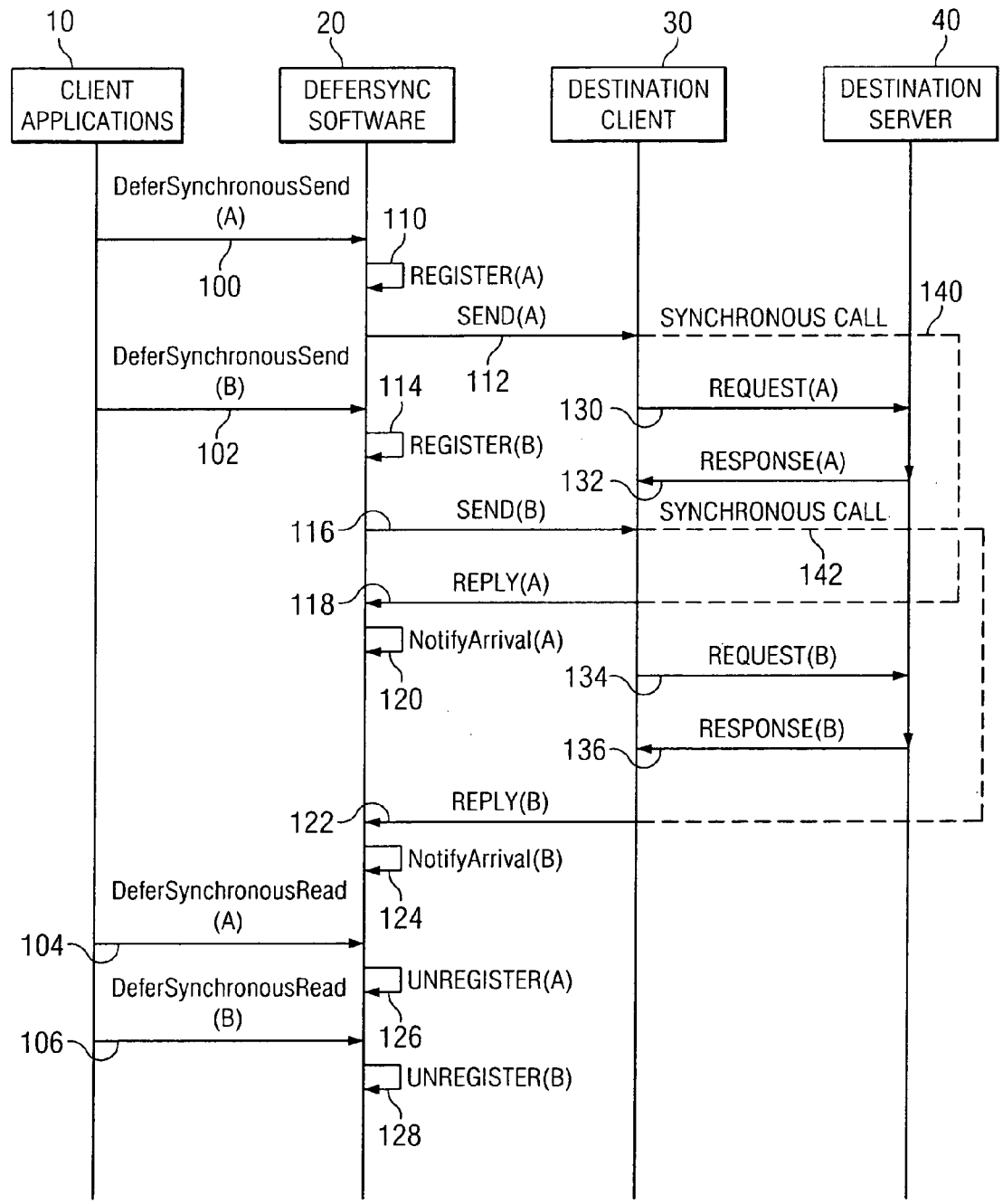

DEFERRED-SYNCHRONOUS MESSAGING SOFTWARE IN A NON-THREADED ENVIRONMENT

FIELD OF THE INVENTION

The invention addresses a method and software for messaging in single or non-threaded environments or operating systems.

BACKGROUND

In a traditional non-threaded environment, applications follow a single thread of execution. This results in synchronous behavior. For example, in a messaging context, an application needs to obtain information from a database. The thread of execution begins with the client application determining a request is needed and generating the request. The thread then follows the request to the destination database (or destination application). The destination application processes the request and sends a reply to the client application. The client application receives the reply to its request and again takes up the thread of execution and moves forward. The client application is frozen, taking no action, from the time the request is sent until a reply is received. This defines traditional synchronous behavior.

More modern operating systems provide multi-threaded environments which facilitate asynchronous behavior. In a multi-threaded environment, the same client application has the option to obtain information sychronously or asynchronously. Synchronous behavior would follow the same path as the single-threaded example described above. To obtain information asynchronously, the client application would invoke an additional thread supported by the operating system and commence the search on that thread, while continuing to move forward on the main thread of execution during the pendency of the search. Once the results had been obtained, the search thread (monitored and maintained by the operating system) would return and notify the client application on the main thread of execution that results were available and provide those results on request of the client application, and subsequently dissipate the thread. The notification and provision of results would occur through hooks and commands built into the same portion of the operating system which manages, tracks, and maintains the multiple threads. By using resources from the operating system, applications can start multiple synchronous calls. For operating systems that support threads, a better solution is to use threads. For operating systems that do not support threads, the alternative is to start new processes, but that is very expensive in programming and CPU overhead for each application to manage a group of separate processes.

One example of a service and event manager taking advantage of a threaded environment is U.S. Pat. No. 6,012,081 issued to Dorn et al, which is incorporated herein by reference. In this and other examples, systems use a thread-supporting environment to support both synchronous and asynchronous messaging and retrieval. To contrast it in another way, the request/response paradigm used in client/server and distributed object systems is an inherently synchronous connection. A client application requests a service from a server. While the server is processing the request, the client waits for the response and is blocked from doing any other work. But client/server and distributed object systems can support asynchronous requests using threads. To execute a request asynchronously, the client application creates a "request" thread and executes the request from within the thread. The request thread remains blocked while the server processes the request, but the main client thread can continue to process other tasks. Multiple threads can be used to process multiple requests concurrently.

SUMMARY OF THE INVENTION

The present invention represents a method and software implementing the method for a client application in a single-threaded environment controlled by a user to request and receive multiple messages asynchronously from a destination application. The actions taken by the method include the client application sending requests to the software agent (the deferred-synchronous messaging software) running in a single-threaded environment. Multiple requests are sent by the client, with following requests able to be sent prior to receiving a response to previous requests. After sending each request the client application is able to continue on in execution in its single-threaded environment prior to receiving responses to each or any of its requests.

The software agent registers the requests and forwards the requests to the destination application. The software agent then begins to cyclically poll the destination application for responses to the requests. Additional requests are processed and sent in between polling cycles. Additional requests are added to the polling cycle and cyclically polled in sequence with the polling for the responses to earlier requests.

The destination application generates the responses to the requests and forwards the responses to the software agent in response to polling from the software agent. The destination application does not necessarily generate the responses in the order the requests were received. In one embodiment, the destination application is resident on a server remote to the client application and to the software agent. In a related alternative embodiment, the remote destination application includes a destination server application and a destination client application which manages requests to and responses from the destination server application. In another alternative, the destination server application may be remote to the client application, while the destination client application is local to the client application. Finally, the invention would equally encompass the accessing and use of several destination applications by the same software agent in response to various requests from various clients, or the use of several destination server applications through a single destination client application which acts as a messaging gateway to the various destination servers. Where the destination application includes a client and server, in one embodiment, the destination client would be the location to which requests were forwarded, the location cyclically polled for a response and the location which forwards the responses to the software agent.

Once any response is generated and forwarded, the software agent receives the response from the destination application, ceases cyclically polling the destination application for that response, and stores that response associated with its request. These actions occur in between the continuing polling cycles.

The stored responses await a request from the client application, which may be generated by the user or by the client application itself, or may never be generated. When generated, the client application polls the software agent for the response to the desired request and the software agent responds by forwarding the desired response from storage to the client application and deleting the response from storage. These actions also occur in between the continuing polling cycles. In one alternative, the software agent is local to the client application and stores the responses locally, and hence retrieves them to forward to the client locally. This represents a substantial improvement in speed and efficiency over having to request and retrieve the responses remotely.

The destination application may or may not generate the responses in the order of requests received. The client application may seek the results of the requests in the order requested or may seek the results in a different order, or may not seek a given result at all.

In a preferred alternative, the software agent may include a callback feature, wherein the client application, in conjunction with sending a request to the software agent, may send a command to register a callback associated with such request. In this circumstance, the software agent, in conjunction with the actions of receiving the first response from the destination application, ceasing cyclically polling the destination application for the first response, and storing the response associated with the request, further takes the action in response to the callback of notifying the user that the response has been received. This notification may take the form of sending a pop-up to the user notifying the user without interrupting the thread of execution of the client application or less preferably the form of notifying the client application that the response has been received and the client application interrupting its thread of execution to notify the user that the response has been received in response to the notification from the software agent. The command registering a callback may include a command resulting in instantiation of a callback object associated with the software agent. In this circumstance, the action of the software agent of notifying the user involves the callback object responding to the storage of the response associated with the request by notifying the user that the response has been received.

Where the destination application is remote, the software agent preferably stores the responses received from the destination application on a server local to the software agent; and forwards the responses from storage on a server local to the software agent. In an additional embodiment, the software agent is resident on a server local to the client application. The storage of responses received from the destination application thus occurs on a server local to the client application, the action of responding by forwarding the responses from storage to the client application forwards such responses from storage on a server local to the client application.

DESCRIPTION OF THE DRAWINGS

FIG. 1 is a process flow diagram illustrating one example of the functioning of the invention.

DETAILED DESCRIPTION

The present invention is a method embodied in a software application, referred to herein as deferred-synchronous messaging software or simply the software, for providing deferred-synchronous messaging capability for applications in a non-threading model. In essence, it enables asynchronous behavior to be executed in parallel within a single-threaded environment. The systems described above required either an operating system or programming environment supporting threads in order to perform multiple synchronous calls in different processes.

The present invention allows applications to perform simultaneous multiple synchronous remote function calls without relying on threading support from the operating system. As a result, applications are able to perform simultaneous multiple synchronous calls without spawning multiple processes.

The present invention provides a model to allow applications to enhance their business processes without using inter-process communications. Thus, it allows simultaneous multiple business synchronous processing without complex inter-process communication logic.

The deferred-synchronous messaging software thus, in a manner of speaking, acts as a software messaging agent (or simply software agent) for one or several client applications, managing their deferred messaging needs, and may equally be referred to as such in this disclosure.

The invention is best understood in the context of a specific operating example incorporating several modes of the deferred-synchronous messaging software's operation. The specifics of the example provided should serve to elucidate the manner and benefits of the operation of the invention, but as will be recognized by one of skill in the art, represent only one specific manner in which the present invention may be employed.

One use of the invention would be in the context of a customer service call center, where customer service agents are responding to calls from customers. As a customer calls in, there are several pieces of information which may be useful to the agent in providing service to the customer such as information about the customer's name, address, and phone number, about the customer's billing history, and about past calls the customer has made regarding problems. These pieces of information are often kept in separate databases sometimes in separate operating systems or environments. In this example, the customer service agent (or user) is working with a client application in a non-threaded environment to record information regarding the call and obtain information needed to process the call and help the customer.

The traditional approach in a non-threaded environment would flow as follows. The customer calls in and the client application searches for (also referred to as "requests") and obtains a piece of information regarding the name, address, and phone number of the customer. While the search is retrieving the information, the client application is locked holding for the response. After receiving this information, the client application seeks any past problem calls from the customer, again locking the application during that search. Finally the client application seeks information regarding the billing history of the customer, again locking the application until these results are returned. Only after all three pieces of information are obtained is the customer service agent able to use the client application to begin providing and recording feedback information to the customer.

In a preferred use of the present invention, from the viewpoint of the client application, the process would flow as follows. The client application would send to the deferred-synchronous messaging software a request to search for any past problem calls. The client application would include an activation command for the callback object with this search. Immediately after sending, before any information is returned, the client application will have completed its efforts on this search and will move on to send to the deferred-synchronous messaging software a request to search for the billing history of the customer. Finally, the client application would itself search for the name, address, and phone number of the customer. The client application would block itself until the results of this search had been returned, but during this time the other searches are running in the background. Once the name/address search has been returned, the client application would be ready to move forward with servicing the customer. If any results turned up on the past problem calls search, the callback object would notify the user of the client application (the customer service agent), for example with a pop-up dialog box, that such results were available and the user could choose to interrupt the client applications efforts to have it go to obtain those results. Finally, if in the course of the call the billing history information became useful, the user could have the client application check with the deferred-synchronous messaging software to obtain (without waiting for a search out to the database) the stored results of the earlier search.

This example illustrates several features and modes of operation of the deferred-synchronous messaging software of the present invention. It is not necessary to the invention to use all of these features in combination. For instance, in the chosen example, some of the information was searched for in a synchronous manner by the client application. This could be done directly or through the deferred-synchronous messaging software. In either case, the synchronous behavior is defined by the client application blocking itself and polling either the search destination or the deferred-synchronous messaging software for a result until a result had arrived. This may be desirable if the information in question is necessary to successfully commence the primary activity of the client application. Note that it is highly preferable for the client application to commence asynchronous searches first before starting any synchronous searches, so that the asynchronous searches may be moving forwards towards conclusion while the client application is waiting on the synchronous search. If the synchronous search is run first, even though its information may be the most important, the other searches will not even be started by the client application until after the results are obtained to the synchronous search.

The deferred-synchronous messaging software, also preferably provides a callback object which may be instantiated by the client application when it initiates a search. This callback object will most preferably notify the user of the client application of the return of results of the search without interrupting the thread of execution of the client application (for example by sending a pop-up screen to the user's graphical interface notifying the user of the presence of the results). Alternatively, but less preferably, the callback object could notify the client application directly and provide the results to it and let it notify the user of the presence of results to such search. The callback object would be particularly useful for results which may or may not be present, but if present are desirable to be known to the user (e.g. there may not be a history of past problem calls, but if there is the information may be very relevant). Hence there is no delay waiting for results which may not exist, but if results do exist, the user is notified and can then obtain them quickly.

The final fundamental deferred synchronous search provides what is by result a simple asynchronous search. The deferred-synchronous messaging software performs the requested search and awaits the result for a defined period of time. This period of time may be defined by the client application generally, by the client application in combination with a specific search, or may be defined as a default for all searches performed by the deferred-synchronous messaging software. When results are returned, or when the process times out, the information returned (or information about the time out respectively) is stored and associated with the requested search. It is maintained until either the client application asks for the results or until it is cleared. Preferably client applications are programmed to clear any outstanding searches they have on exiting, but clearing could also be arranged by the deferred-synchronous messaging software itself when it is exited, or on a set schedule, or on a set age of the request, or when requested manually. This type of search would be used for information which is commonly but not always useful to the client application and its user. Thus, as in the example above, if the billing history information is not necessary or helpful to solve the customer's problem, the client application and user never access the results of the asynchronous search and never spend time waiting on such results. Alternatively, if the billing information does turn out to be helpful, the user through the client application will access the stored search results on the deferred-synchronous messaging software and have more rapid response than if an entirely new search needed to be generated and information obtained from a remote database. The delay time dealt with by the user and hence the customer is thus minimized. In the event that the deferred synchronous search itself timed out without obtaining a response, the client application could at its option then retry the search, either as a synchronous search (now that the information is known to be needed) or as one of the asynchronous searches described above.

From the point of view of the deferred-synchronous messaging software, which is also able to run in a single-threaded environment, the requests would be handled as follows. The execution thread of the deferred-synchronous messaging software would cycle step by step through a series of processes. The software would check for any new requests which had been made. The software would send any new requests out to appropriate databases or more generally to destination applications (or to messaging systems which are gateways to one or several applications). When requests were being sent out, the software would also save a note to a queue awaiting responses. The software would poll the destination for each request for which a response had not been received to see if a response was available. The software would obtain any response available, store it for future retrieval, and delete the note off of the awaiting response queue. The software would check to see if any unresponded to requests had timed out and if so store that fact for future retrieval and delete the note off of the awaiting response queue. The software or the instantiated callback objects would check the retrieved responses to see if any notification needs to be made to the client application. And then the software would cycle through the same routine again on a continuing repeating basis. Obviously, the exact sequence of processes described above is not required to obtain the benefits of the present invention. Note however, that the software is able to manage and process multiple requests without benefit of multiple threads of action provided by the operating system or environment. Additionally, while the example above describes a single client application sending two or three requests to the deferred-synchronous messaging software for processing, the software is equally, and preferably, capable of queueing and managing multiple requests from multiple client applications running. So for example, each customer service agent in a call center could be running an instantiation of a client application from their individual terminal or workstation, all of which are using the same deferred-synchronous messaging software for their deferred requests. Either supporting a single client application with multiple requests, or multiple applications with multiple requests, the deferred-synchronous messaging software consolidates the burdensome management of a collection of called processes into a single application running in a single-thread outside of the client applications, rather than requiring the client applications to maintain and manage multiple spawned processes.

A more general example is illustrated in FIG. 1. FIG. 1 is a process flow diagram of a system incorporating one or multiple client applications 10, the deferred-synchronous messaging software 20 and a back-end server 40 and its client application 30. In this diagram, the client applications 10 need to make requests for information from the destination server 40. Requests for destination server 40 are handled by the destination client 30 which may take the form of a messaging system, a gateway, or other entry means to the server. In a traditional non-threaded environment, a client application 10 would make a synchronous request for information to destination client 30, and block further execution on the client application, while consistently polling client 30 until client 30 received a response from server 40 which would then be forwarded back to the client application in response to its polling.

As FIG. 1 illustrates, under the present invention, where more asynchronous behavior is desired, in step 100 client application 10 sends a request (a) to software 20. In step 110, the software 20 registers the request (a) and sends it to destination client 30 in step 112. In step 130, destination client 30 makes request (a) of destination server 40, which processes the request and provides response (a) to destination client 30 in step 132. Although not illustrated in this diagram, after sending the request (a) in step 112, software 20 is cyclically polling destination client 30 to see if a response has returned. In step 118, software 20 receives a reply (a) to its request (a) from destination client 30. Software 20 stores the reply (a) and in step 120, software 20 notifies of arrival of reply (a). This notification may take the form of a marker placed in a queue list maintained by software 20, of a display sent to the user of the appropriate client application 10, or of notice sent to client application 10 directly. The latter two actions are preferably taken at the request of client application 10, which on the sending of its initial request (a) in step 100 also requests a callback object be instantiated. In a more preferred embodiment, the callback object manages the notification of the user and/or client application of receipt of the reply. Finally, in step 104, client application 10 seeks the information contained in reply (a) and receives it directly from software 20. In step 126 software 20 unregisters the request and clears the relevant information from its queues and storage.

A substantially identical series of steps is followed with respect to the parallel request (b) in 102, 114, 116, 134, 136, 122, 124, & 128. Note that the client applications 10 are able to continue running forward after sending requests (a) and (b) in steps 100 & 102 respectively and only come back to get the results as needed at a later time in steps 104 & 106. It is also contemplated that client applications may not even need to get the results, in which case they would remain stored with software 20 until cleared as discussed earlier. This illustrates the asynchronous behavior permitted the client applications 10 by the software 20. In this manner, software 20 was also running the requests in parallel with respect to the activities of client applications 10.

Note also, that with respect to the actions of software 20 with respect to the destination client 30 and server 40, the collection of steps grouped as task 140 and the collection of steps grouped as task 142 represent traditional synchronous calls seeking information. The software 20 sent a request and then polled the destination until a response was received. While the software 20, was in fact polling several requests sequentially, this is effectively transparent to the destination client 30 and server 40, as there is always some separation between polling requests and the only result of polling several requests sequentially is that as the number of requests increase, the time between polls of any one request would also increase. But destination client 30 and server 40 do not know and are not concerned with reasons for the time between polls. Since a steady polling is done until a response is received, the increased reliability goal of synchronous messaging is achieved, but from the client applications' standpoint they may defer obtaining the results of their requests until they need them. Again, client applications 10 may represent a single client application making multiple requests, or multiple client applications making requests to the same software 20.

Although only a couple of embodiments of the present invention have been described, it should be understood that the present invention may be embodied in many other specific forms without departing from the spirit or the scope of the present invention. Therefore, the present examples are to be considered as illustrative and not restrictive, and the invention is not to be limited to the details given herein, but may be modified within the scope of the appended claims along with their full scope of equivalents.

What is claimed is:

1. A method for a client application operating in a single-threaded architecture controlled by a user to request and receive multiple messages asynchronously from a destination application, the method comprising:

the user requesting information for processing via the client application, the information including a first and second, sets of information, the client application sending a first request for the first set of information to a software agent, the client application and the software agent operating in a single-threaded architecture;

the client application sending a second request for the second set of information to the software agent prior to receiving a response to the first request from the software agent;

the client application processing other sets of information and continuing on in execution in its single-threaded environment prior to receiving responses to the first request or the second request from the software agent, the first, second, and other sets of information containing related information;

the software agent registering the first request and forwarding the first request to the destination application;

the software agent beginning to cyclically poll the destination application for a first response to the first request;

the software agent in between intermittent polling requests registering the second request and forwarding the second request to the destination application;

the software agent beginning to cyclically poll the destination application for a second response to the second request, wherein such polling repeats in sequence with the polling for the first response to the first request;

the destination application generating the fist response to the first request and forwarding the first response containing the first set of information to the software agent in response to polling from the software agent;

the software agent receiving the first response from the destination application, ceasing cyclically polling the destination application for the first response, and storing the first response associated with the first request, wherein such actions of receiving, ceasing, and storing occur in between the continuing intermittent polling requests;

the destination application generating the second response to the second request and forwarding the second response containing the second set of information to the software agent in response to polling from the software agent;

the software agent receiving the second response from the destination application, ceasing cyclically polling the destination application for the second response, and storing the second response associated with the second request, wherein such actions of receiving, ceasing, and storing occur in between the continuing intermittent polling requests;

the client application polling the software agent for the first response to the first request and the software agent responding by forwarding the first response from storage to the client application and deleting the first response from storage, wherein the actions of responding by forwarding and deleting occur in between the continuing intermittent polling requests;

the client application polling the software agent for the second response to the second request and the software agent responding by forwarding the second response from storage to the client application and deleting the response from storage, wherein the actions of responding by forwarding and deleting occur in between the continuing intermittent polling requests.

2. The method of claim 1, wherein the action of the client application of sending the second request occurs after the actions of the software agent of registering the first request and forwarding the first request to the destination application and of beginning to cyclically poll the destination application for a first response to the first request.

3. The method of claim 1, wherein the action of the client application of sending the second request occurs before the actions of the software agent of registering the first request and forwarding the first request to the destination application and of beginning to cyclically poll the destination application for a first response to the first request.

4. The method of claim 1, wherein the action of the destination application of generating the second response to the second request occurs prior to the action of the destination application of generating the first response to the first request; and wherein the action of the software agent of receiving the second response from the destination application, and performing the actions of ceasing polling and storing related to the second response occur prior to the actions of the software agent of receiving the first response from the destination application, and performing the actions of ceasing polling and storing related to the first response.

5. The method of claim 1, wherein the action of the destination application of generating the second response to the second request occurs after the action of the destination application of generating the first response to the first request; and wherein the action of the software agent of receiving the second response from the destination application, and performing the actions of ceasing polling and storing related to the second response occur after the actions of the software agent of receiving the first response from the destination application, and performing the actions of ceasing polling and storing related to the first response.

6. The method of claim 4, wherein the action of the client application polling the software agent for the second response to the second request and the subsequent forwarding and deleting actions related to the second response to the second request occur prior to the action of the client application polling the software agent for the first response to the first request and the subsequent forwarding and deleting actions related to the first response to the first request.

7. The method of claim 4, wherein the action of the client application polling the software agent for the second response to the second request and the subsequent forwarding deleting actions related to the second response to the second request occur after the action of the client application polling the software agent for the first response to the first request and the subsequent forwarding and deleting actions related to the first response to the first request.

8. The method of claim 1, wherein the action of the client application polling the software agent for the first response to the first request and the subsequent forwarding and deleting actions related to the first response to the first request occur prior to the actions of the destination application generating the second response to the second request and forwarding the second response to the software agent and prior to subsequent actions of the software agent and of the client application involving the second response.

9. The method of claim 1, wherein the destination application is resident on a server remote to the client application and to the software agent; and wherein the actions of the software agent of storing the responses received from the destination application stores such responses on a server local to the software agent; and wherein the actions of the software agent of responding by forwarding the responses from storage to the client application forwards such responses from storage on a server local to the software agent.

10. The method of claim 9, wherein the software agent is resident on a server local to the client application; and wherein the actions of the software agent of storing the responses received from the destination application stores such responses on a server local to the client application; and wherein the actions of the software agent of responding by forwarding the responses from storage to the client application forwards such responses from storage on a server local to the client application.

11. The method of claim 9, wherein the remote destination application comprises a destination server application and a destination client application which manages requests to and responses from the destination server application; and wherein the actions of forwarding the requests to the destination application comprise forwarding the requests to the destination client application; and wherein the actions of the software agent of cyclically polling the destination application comprise cyclically polling the destination client application for the responses to the requests; and wherein the actions of the destination application forwarding the responses to the software agent in response to polling from the software agent comprise the destination client application forwarding responses to the software agent.

12. The method of claim 1, further comprising:

the client application, in conjunction with sending a first request to the software agent, sending a command to register a callback associated with such first request;

the software agent, in conjunction with the actions of receiving the first response from the destination application, ceasing cyclically polling the destination application for the first response, and storing the first response associated with the first request, further takes the action in response to the callback of notifying the user that the first response has been received.

13. The method of claim 12, wherein the command to register a callback comprises a command resulting in instantiation of a callback object associated with the software agent; and
wherein the action of the software agent of notifying the user comprises the callback object responding to the storage of the first response associated with the first request by notifying the user that the first response has been received.

14. The method of claim 12, wherein the action of notifying the user that the first response has been received comprises sending a popup to the user notifying the user without interrupting the thread of execution of the client application.

15. The method of claim 12, wherein the action of notifying the user that the first response has been received comprises notifying the client application that the first response has been received and the client application interrupting its thread of execution to notify the user that the first response has been received in response to the notification from the software agent.

16. The method of claim 1, wherein the related information is further defined as customer information and wherein the first, second, and other sets of information contain a portions of information related to a specific customer.

17. A method for a client application operating in a single-threaded architecture controlled by a user to request and receive multiple messages asynchronously from a destination application, the method comprising:
the client application sending a first request to a software agent, the client application and the software agent operating in a single-threaded architecture, the first request sent by the client application including a command to register a callback associated with such first request;
the client application sending a second request to the software agent prior to receiving a response to the first request from the software agent;
the client application continuing on in execution in its single-threaded environment prior to receiving responses to the first request or the second request from the software agent;
the software agent registering the first request and forwarding the first request to the destination application;
the software agent beginning to cyclically poll the destination application for a first response to the first request;
the software agent in between intermittent polling requests registering the second request and forwarding the second request to the destination application;
the software agent beginning to cyclically poll the destination application for a second response to the second request, wherein such polling repeats in sequence with the polling for the first response to the first request;
the destination application generating the first response to the first request and forwarding the first response to the software agent in response to polling from the software agent;

the software agent, in conjunction with the actions of receiving the first response from the destination application, ceasing cyclically polling the destination application for the first response, and storing the first response associated with the first request, the software agent further takes the action in response to the callback of notifying the user that the first response has been received;
the destination application generating the second response to the second request and forwarding the second response to the software agent in response to polling from the software agent;
the software agent receiving the second response from the destination application, ceasing cyclically polling the destination application for the second response, and storing the second response associated with the second request, wherein such actions of receiving, ceasing, and storing occur in between the continuing intermittent polling requests;
the client application polling the software agent for the first response to the first request and the software agent responding by forwarding the first response from storage to the client application and deleting the first response from storage, wherein the actions of responding by forwarding and deleting occur in between the continuing intermittent polling requests;
the client application polling the software agent for the second response to the second request and the software agent responding by forwarding the second response from storage to the client application and deleting the response from storage, wherein the actions of responding by forwarding and deleting occur in between the continuing intermittent polling requests.

18. The method of claim 17, wherein the command to register a callback comprises a command resulting in instantiation of a callback object associated with the software agent; and
wherein the action of the software agent of notifying the user comprises the callback object responding to the storage of the first response associated with the first request by notifying the user that the first response has been received.

19. The method of claim 17, wherein the action of notifying the user that the first response has been received comprises sending a pop-up to the user notifying the user without interrupting the thread of execution of the client application.

20. The method of claim 17, wherein the action of notifying the user that the first response has been received comprises notifying the client application that the first response has been received and the client application interrupting its thread of execution to notify the user that the first response has been received in response to the notification from the software agent.

* * * * *